US012641664B2

(12) United States Patent
Chang et al.

(10) Patent No.: US 12,641,664 B2
(45) Date of Patent: May 26, 2026

(54) TECHNIQUES FOR RADIO RESOURCE CONTROL RECONFIGURATION ALIGNMENT

(71) Applicant: QUALCOMM INCORPORATED, San Diego, CA (US)

(72) Inventors: Jingming Chang, Shenzhen (CN); Haojun Wang, Xian (CN); Jinglin Zhang, Shenzhen (CN); Zhuoqi Xu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 18/264,742

(22) PCT Filed: Apr. 30, 2021

(86) PCT No.: PCT/CN2021/091487
§ 371 (c)(1),
(2) Date: Aug. 8, 2023

(87) PCT Pub. No.: WO2022/227001
PCT Pub. Date: Nov. 3, 2022

(65) Prior Publication Data
US 2024/0114577 A1 Apr. 4, 2024

(51) Int. Cl.
*H04W 76/20* (2018.01)
*H04L 1/08* (2006.01)
(Continued)

(52) U.S. Cl.
CPC ............... *H04W 76/19* (2018.02); *H04L 1/08* (2013.01); *H04L 5/0053* (2013.01); *H04W 28/06* (2013.01); *H04W 76/20* (2018.02)

(58) Field of Classification Search
None
See application file for complete search history.

(56) References Cited

U.S. PATENT DOCUMENTS

2009/0129315 A1    5/2009  Meylan
2014/0192775 A1 *  7/2014  Li ........................ H04W 74/006
                                                          370/331
(Continued)

FOREIGN PATENT DOCUMENTS

CN            101868934          10/2010
WO      WO-2009067291            5/2009
WO      WO-2019135286 A1         7/2019

OTHER PUBLICATIONS

International Search Report and Written Opinion—PCT/CN2021/091487—ISA/EPO—Jan. 28, 2022.
(Continued)

*Primary Examiner* — Kodzovi Acolatse
(74) *Attorney, Agent, or Firm* — Holland & Hart LLP

(57) ABSTRACT

Methods, systems, and devices for wireless communications are described. A user equipment (UE) may receive, from a base station, a radio resource control (RRC) reconfiguration message. The UE may reestablish a radio link control (RLC) entity based on receiving the RRC reconfiguration message and transmit an indication that the RLC entity has been reestablished at the UE. In some cases, the UE may receive a data message prior to receiving an acknowledgment for the indication that the RLC entity is reestablished. For example, the base station may retransmit the RRC reconfiguration message prior to sending an acknowledgment status report. The UE may discard the data message based on the data message being received prior to receiving the acknowledgment.

30 Claims, 10 Drawing Sheets

(51) Int. Cl.

| | |
|---|---|
| *H04L 5/00* | (2006.01) |
| *H04W 28/06* | (2009.01) |
| *H04W 76/19* | (2018.01) |

(56) References Cited

U.S. PATENT DOCUMENTS

| | | | | |
|---|---|---|---|---|
| 2018/0199163 A1* | 7/2018 | Chen | ..................... | H04W 48/14 |
| 2020/0267757 A1 | 8/2020 | Bhattad et al. | | |
| 2021/0112612 A1* | 4/2021 | Sharma | ................. | H04W 72/04 |
| 2022/0394806 A1* | 12/2022 | Rugeland | ............. | H04W 76/19 |
| 2023/0189295 A1* | 6/2023 | Baek | ..................... | H04W 76/40 |
| | | | | 370/312 |

OTHER PUBLICATIONS

Lenovo, et al., "Discussion on Resource Allocation for NR Sidelink Mode 2", 3GPP Draft, 3GPP TSG RAN WG1 #100bis, e-Meeting, Apr. 20-30, 2020, 6 Pages.
ZTE: "Issues on RLC Reestablishment Indication", 3GPP Draft, 3GPP TSG-RAN WG3 #101, R3-184668, Gothenburg, Sweden, Aug. 20-24, 2018, pp. 1-3, Section 1-2.

\* cited by examiner

Acknowledgment
225

Retransmit RRC
Reconfiguration
210

RRC
Reconfiguration
205

220
Reconfig
Complete

215
Trigger SR 105-a 115-a

200

410

420

415

405

400

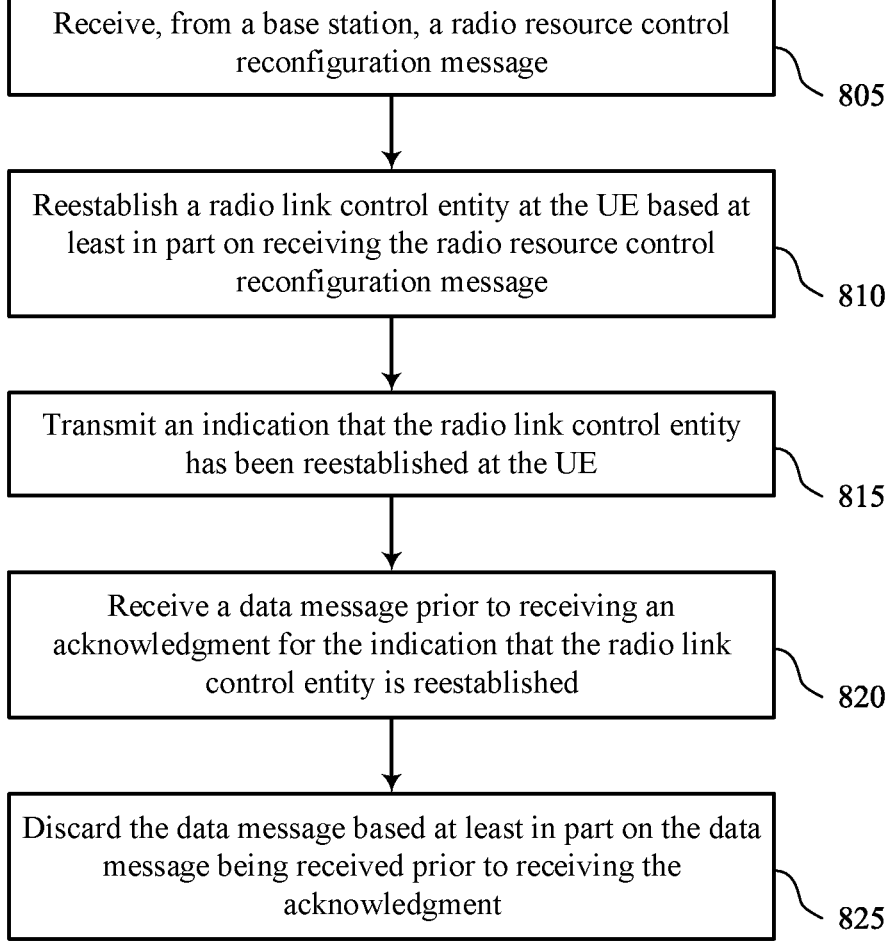

Receive, from a base station, a radio resource control reconfiguration message

805

Reestablish a radio link control entity at the UE based at least in part on receiving the radio resource control reconfiguration message

810

Transmit an indication that the radio link control entity has been reestablished at the UE

815

Receive a data message prior to receiving an acknowledgment for the indication that the radio link control entity is reestablished

820

Discard the data message based at least in part on the data message being received prior to receiving the acknowledgment

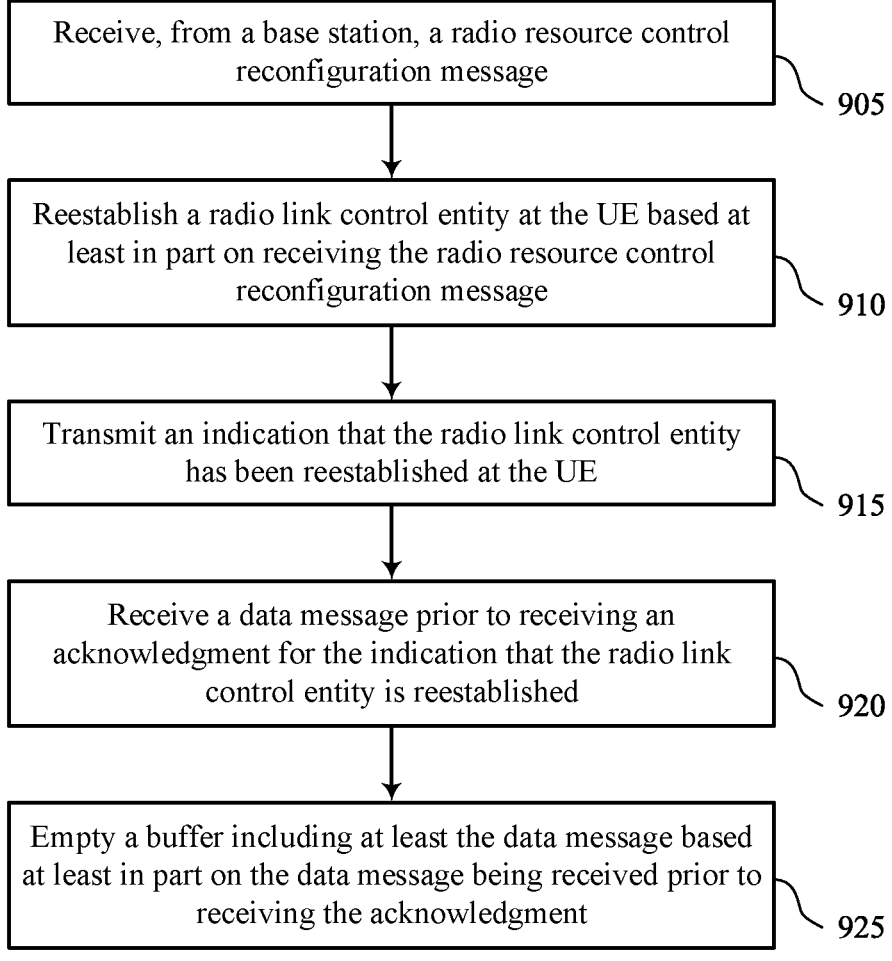

Receive, from a base station, a radio resource control reconfiguration message

⟍ 905

Reestablish a radio link control entity at the UE based at least in part on receiving the radio resource control reconfiguration message

⟍ 910

Transmit an indication that the radio link control entity has been reestablished at the UE

⟍ 915

Receive a data message prior to receiving an acknowledgment for the indication that the radio link control entity is reestablished

⟍ 920

Empty a buffer including at least the data message based at least in part on the data message being received prior to receiving the acknowledgment

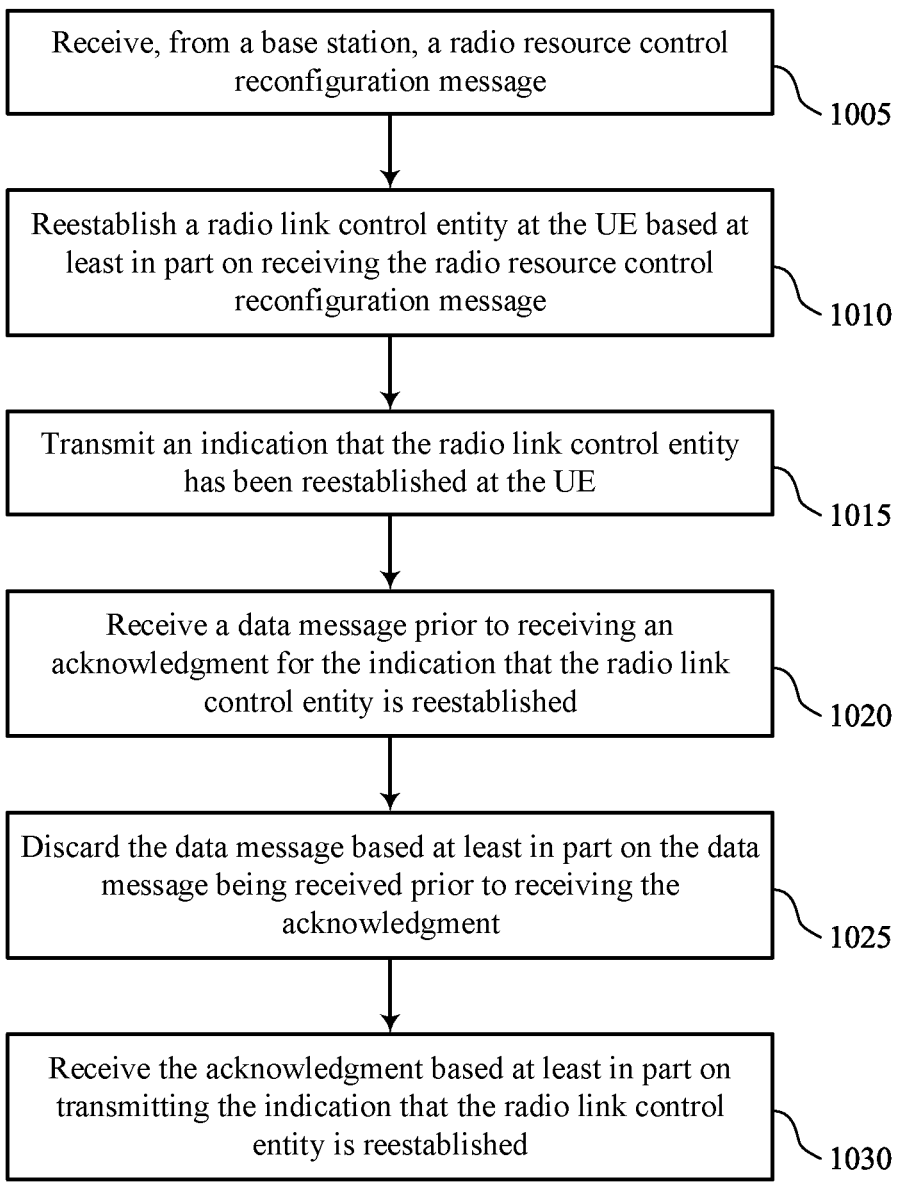

Receive, from a base station, a radio resource control reconfiguration message

1005

Reestablish a radio link control entity at the UE based at least in part on receiving the radio resource control reconfiguration message

1010

Transmit an indication that the radio link control entity has been reestablished at the UE

1015

Receive a data message prior to receiving an acknowledgment for the indication that the radio link control entity is reestablished

1020

Discard the data message based at least in part on the data message being received prior to receiving the acknowledgment

1025

Receive the acknowledgment based at least in part on transmitting the indication that the radio link control entity is reestablished

TECHNIQUES FOR RADIO RESOURCE CONTROL RECONFIGURATION ALIGNMENT

CROSS REFERENCE

The present Application is a 371 national stage filing of International PCT Application No. PCT/CN2021/091487 by CHANG et al. entitled "TECHNIQUES FOR RADIO RESOURCE CONTROL RECONFIGURATION ALIGNMENT," filed Apr. 30, 2021, which is assigned to the assignee hereof, and which is expressly incorporated by reference in its entirety herein.

FIELD OF TECHNOLOGY

The following relates to wireless communications, including techniques for radio resource control reconfiguration alignment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for radio resource control (RRC) reconfiguration alignment. Generally, the described techniques provide for discarding data messages received at a reestablished user equipment (UE) radio link control (RLC) entity prior to receiving an acknowledgment status report for an RRC complete message. A base station may send an RRC message to the UE to reconfigure an RLC entity. In some cases, the UE may have a long processing time or delay for RRC reconfiguration, and in some cases, the base station may retransmit the RRC reconfiguration message. However, the UE may finish reestablishing the RLC entity prior to receiving the retransmission of the RRC reconfiguration message. When the UE reestablishes the RLC entity, the UE may clear or empty an RLC buffer. The UE may discard all received data at the reestablished RLC entity until the UE receives an acknowledgment status report from the base station. If, for example, the UE receives a retransmission of the RRC reconfiguration message before receiving an acknowledgment for a reconfiguration complete message, the UE may discard the retransmission of the RRC reconfiguration message. This way, the UE may not treat the retransmission of the RRC reconfiguration message as a new RLC message, which could lead to an RLC state mismatch. In some cases, the UE may discard all received messages based on a sequence number or value of a next transmission acknowledgment included in the message.

A method for wireless communications at a UE is described. The method may include receiving, from a base station, an RRC reconfiguration message, reestablishing an RLC entity at the UE based on receiving the RRC reconfiguration message, transmitting an indication that the RLC entity has been reestablished at the UE, receiving a data message prior to receiving an acknowledgment for the indication that the RLC entity is reestablished, and discarding the data message based on the data message being received prior to receiving the acknowledgment.

An apparatus for wireless communications at a UE is described. The apparatus may include a processor, memory coupled with the processor, and instructions stored in the memory. The instructions may be executable by the processor to cause the apparatus to receive, from a base station, an RRC reconfiguration message, reestablish an RLC entity at the UE based on receiving the RRC reconfiguration message, transmit an indication that the RLC entity has been reestablished at the UE, receive a data message prior to receiving an acknowledgment for the indication that the RLC entity is reestablished, and discard the data message based on the data message being received prior to receiving the acknowledgment.

Another apparatus for wireless communications at a UE is described. The apparatus may include means for receiving, from a base station, an RRC reconfiguration message, means for reestablishing an RLC entity at the UE based on receiving the RRC reconfiguration message, means for transmitting an indication that the RLC entity has been reestablished at the UE, means for receiving a data message prior to receiving an acknowledgment for the indication that the RLC entity is reestablished, and means for discarding the data message based on the data message being received prior to receiving the acknowledgment.

A non-transitory computer-readable medium storing code for wireless communications at a UE is described. The code may include instructions executable by a processor to receive, from a base station, an RRC reconfiguration message, reestablish an RLC entity at the UE based on receiving the RRC reconfiguration message, transmit an indication that the RLC entity has been reestablished at the UE, receive a data message prior to receiving an acknowledgment for the indication that the RLC entity is reestablished, and discard the data message based on the data message being received prior to receiving the acknowledgment.

In some examples of the method, apparatuses, and non-transitory computer-readable medium described herein, discarding the data message may include operations, features, means, or instructions for emptying a buffer including at least the data message based on the data message being received prior to receiving the acknowledgment.

In some examples of the method, apparatuses, and non-transitory computer-readable medium described herein, the buffer may be an RLC buffer.

Some examples of the method, apparatuses, and non-transitory computer-readable medium described herein may further include operations, features, means, or instructions for receiving the acknowledgment based on transmitting the indication that the RLC entity may be reestablished.

In some examples of the method, apparatuses, and non-transitory computer-readable medium described herein, discarding the data message may include operations, features, means, or instructions for discarding the data message based on a next transmission indicator associated with the data message corresponding to a different RLC configuration than the reestablished RLC entity.

In some examples of the method, apparatuses, and non-transitory computer-readable medium described herein, receiving the data message may include operations, features, means, or instructions for receiving a retransmission of the RRC reconfiguration message based on a delay for reestablishing the RLC entity, where the data message may be discarded based on receiving the retransmission of the RRC reconfiguration message.

In some examples of the method, apparatuses, and non-transitory computer-readable medium described herein, receiving the RRC reconfiguration message may include operations, features, means, or instructions for receiving the RRC reconfiguration message for a signaling radio bearer corresponding to dedicated RRC signaling.

In some examples of the method, apparatuses, and non-transitory computer-readable medium described herein, the RRC reconfiguration message and the data message correspond to a same sequence number.

In some examples of the method, apparatuses, and non-transitory computer-readable medium described herein, the RRC reconfiguration message corresponds to a first sequence number and the indication that the RLC entity may be reestablished corresponds to a second sequence number that may be different from the first sequence number.

BRIEF DESCRIPTION OF THE DRAWINGS

FIGS. 8 through 10 show flowcharts illustrating methods that support techniques for radio resource control reconfiguration alignment in accordance with aspects of the present disclosure.

DETAILED DESCRIPTION

A user equipment (UE) may be configured to establish or reestablish a Radio Link Control (RLC) entity. An RLC entity at an RLC layer of the UE may perform packet segmentation and reassembly to communicate over logical channels. A base station may send a Radio Resource Control (RRC) message to the UE to reconfigure an RLC entity. In some cases, the RRC message may reconfigure an RLC entity for a certain signaling radio bearer (SRB). For example, the UE may be configured to reestablish an RLC entity for SRB 1, which may be used for RRC messages and non-access stratum (NAS) messages. In some cases, the UE may have a long processing time or delay for RRC reconfiguration. The base station may determine that the original RRC reconfiguration message was not received at the UE due to the delay, and the base station may retransmit the RRC reconfiguration message. However, the UE may finish reestablishing the RLC entity prior to receiving the retransmission of the RRC reconfiguration message. When the UE reestablishes the RLC entity, the UE may clear an RLC buffer. Therefore, the UE may treat the retransmission of the RRC message as a new RLC message, such as a next RLC message in the reestablishing procedure. The UE may report an acknowledgment for both the original RRC message and the retransmission RRC message, while the base station only expects a single acknowledgment for the RRC reconfiguration message. Therefore, the UE and the network may determine different states for the RLC entity at the UE, leading to a mismatch between the network and the UE.

The present disclosure describes techniques for RRC reconfiguration alignment at a UE. For example, after reestablishing an RLC entity at a UE, the UE may discard all received data until the UE receives an acknowledgment status report from the base station. If, for example, the UE receives a retransmission of the RRC reconfiguration message prior to receiving an acknowledgment for a reconfiguration complete message, the UE may discard the retransmission of the RRC reconfiguration message. This way, the UE may not treat the retransmission of the RRC reconfiguration message as a new RLC message, which leads to the RLC state mismatch. In some cases, the UE may discard all received messages based on a sequence number or value of a next transmission acknowledgment included in the message.

Aspects of the disclosure are initially described in the context of wireless communications systems. Some aspects of the present disclosure are further illustrated by and described with reference to a process flow. Aspects of the disclosure are further illustrated by and described with reference to apparatus diagrams, system diagrams, and flowcharts that relate to techniques for radio resource control reconfiguration alignment.

Figure 1:
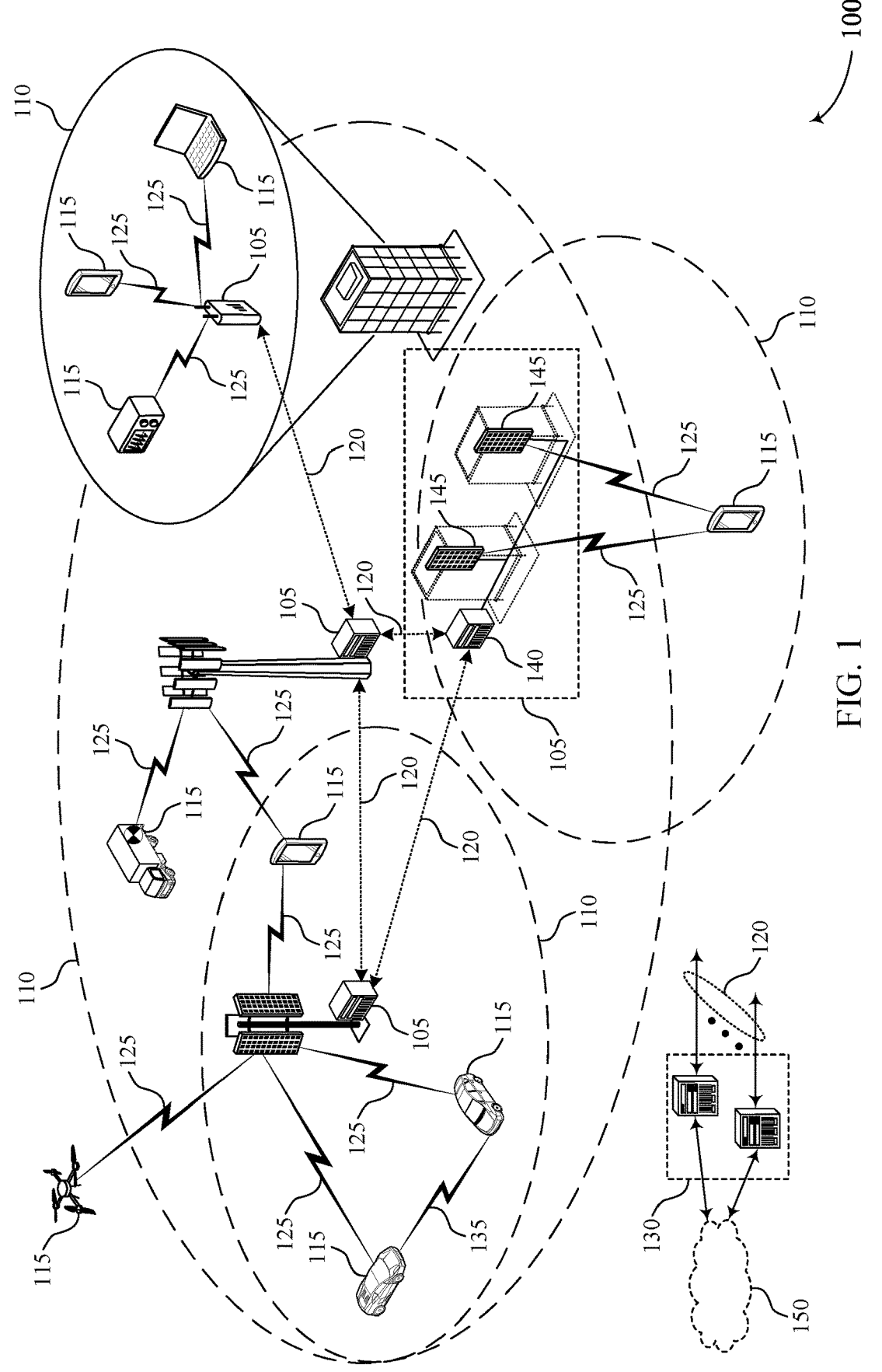
FIG. 1 illustrates an example of a wireless communications system that supports techniques for radio resource control reconfiguration alignment in accordance with aspects of the present disclosure.

FIG. 1 illustrates an example of a wireless communications system 100 that supports techniques for radio resource control reconfiguration alignment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (A f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured to establish or reestablish an RLC entity. A base station 105 may send an RRC message to the UE 115 to reconfigure an RLC entity. For example, the base station 105 may send an RRC reconfiguration message associated with a first sequence number (e.g., SN1). In some cases, the RRC reconfiguration message may include a field indicating an SRB for RRC reconfiguration. For example, the RRC reconfiguration message may indicate to reestablish an RLC entity for one or more SRBs, such as SRB 1.

In some cases, the RRC message may reconfigure an RLC entity for a certain SRB. For example, the UE 115 may be configured to reestablish an RLC entity for SRB 1, which may be used for RRC messages and non-access stratum (NAS) messages. In some cases, the SRB 1 may be used for RRC message and NAS message prior to establishing another SRB (e.g., SRB 2), which may be used for NAS message over a dedicated control channel (DCCH). SRB2 may have a lower priority than SRB 1 and may be configured by the network after security activation.

In some cases, the UE 115 may have a long processing time or delay for RRC reconfiguration. In some cases, the delay may be based on a poor wireless signal quality, a long UE processing time, an uplink shared channel block error rate (BLER) delay, or a delay for a scheduling request. The base station 105 may determine that the original RRC reconfiguration message was not received at the UE 115 due to the delay, and the base station 105 may retransmit the RRC reconfiguration message. In this transition period, the network may retransmit the RRC reconfiguration message before receiving an RRC reconfiguration complete message from the UE 115.

However, the UE 115 may finish reestablishing the RLC entity prior to receiving the retransmission of the RRC reconfiguration message. For example, the UE 115 may discard the UE uplink RLC status report for the RRC reconfiguration after reestablishing the RLC entity. When the UE 115 reestablishes the RLC entity, the UE 115 may clear an RLC buffer. Therefore, the UE 115 may treat the retransmission of the RRC message as a new RLC message, such as a next RLC message in the reestablishing procedure. For example, at the UE 115, the UE 115 may treat the retransmission of the RRC reconfiguration message as an RLC protocol data unit (PDU) with sequence number 1.

The UE 115 may report an acknowledgment for both the original RRC message and the retransmission RRC message, while the base station 105 only expects a single acknowledgment for the RRC reconfiguration message. After the network receives an RRC reconfiguration complete message, the network may reestablish SRB 1 RLC and send another RRC reconfiguration with an RLC sequence number to the UE 115. Therefore, the UE 115 and the network may determine different states for the RLC entity at the UE 115, leading to a mismatch between the network and the UE 115. At the UE 115, the new RLC entity may have received RLC messages with sequence numbers 0 and 1 and report an acknowledgement for two RLC messages, which may lead to an RLC state mismatch.

Wireless communications systems described herein, such as the wireless communications system 100, may implement techniques for RRC reconfiguration alignment at a UE 115. For example, after reestablishing an RLC entity at a UE 115, the UE 115 may discard all received data until the UE 115 receives an acknowledgment status report from the base station. If, for example, the UE 115 receives a retransmission of the RRC reconfiguration message prior to receiving an acknowledgment for a reconfiguration complete message, the UE 115 may discard the retransmission of the RRC reconfiguration message. This way, the UE 115 may not treat the retransmission of the RRC reconfiguration message as a new RLC message, which leads to the RLC state mismatch. In some cases, the UE may discard all received messages based on a sequence number or value of a next transmission acknowledgment included in the message.

Figure 2:
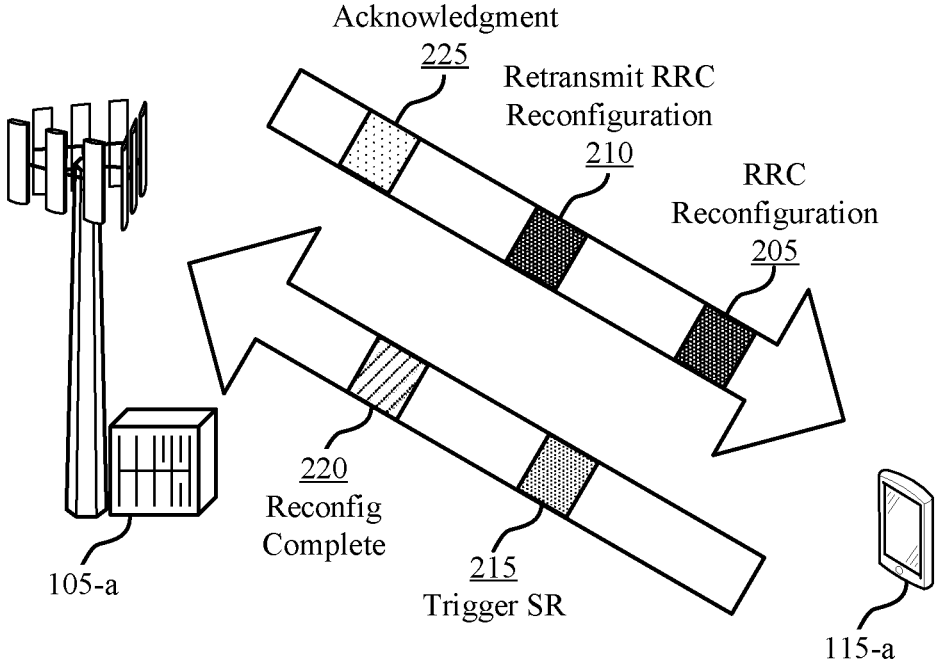
FIG. 2 illustrates an example of a wireless communications system that supports techniques for radio resource control reconfiguration alignment in accordance with aspects of the present disclosure.
Figure 2:

FIG. 2 illustrates an example of a wireless communications system 200 that supports techniques for radio resource control reconfiguration alignment in accordance with aspects of the present disclosure. The wireless communications system 200 may implement some aspects of, or be an example of, a wireless communications system 100. The wireless communications system 200 may include a UE 115-a and a base station 105-a, which may be respective examples of a UE 115 and a base station 105 as described with reference to FIG. 1.

The base station 105-a may transmit an RRC reconfiguration message 205 to the UE 115-a. The RRC reconfiguration message 205 may configure the UE 115-a to reestablish an RLC entity at the UE 115-a. For example, the RRC reconfiguration message 205 may include a field indicating to reestablish an RLC entity for an SRB, such as SRB 1.

The UE 115-a may begin a process to reestablish the RLC entity for the SRB. However, the UE 115-a may experience a delay for reestablishing the RLC entity or for sending an RRC reconfiguration success message. For example, a wireless channel between the UE 115-a and the base station 105-a may have poor channel conditions, the UE 115-a may have a slow processing time, the UE 115-a may experience uplink BLER delay, or the UE 115-a may not have available resources to send a scheduling request, or any combination thereof.

The base station 105-a may detect the delay for completing the RLC entity reestablishment, and the base station 105-a may send a retransmission 210 of the RRC reconfiguration to the UE 115-a. The base station 105-a may send the retransmission 210 prior to receiving an RRC reconfiguration complete message 220 from the UE 115-a.

However, the UE 115-a may complete the reestablishment process based on receiving the RRC reconfiguration message 205 prior to receive the retransmission 210. For example, the UE 115-a may reestablish the RLC entity and transmit a scheduling request 215 to the base station 105-a to send the RRC reconfiguration complete message 220. Therefore, the UE 115-a may receive the retransmission 210 of the RRC reconfiguration message after reestablishing the RLC entity but prior to sending the RRC reconfiguration complete message 220.

In some other systems, a UE 115 may treat the retransmission 210 of the RRC reconfiguration message as a new RLC PDU after reestablishing the RLC entity. For example, the UE 115 of other systems may discard an uplink RLC status report for the RRC reconfiguration message 205 after reestablishing the RLC entity. Therefore, the UE 115 may not have information for the original RRC reconfiguration message 205, and the UE 115 may treat the retransmission 210 as a new RLC PDU, which can lead to an RLC state mismatch between the UE 115 and the network.

The wireless communications system 200 may implement techniques to prevent an RLC state mismatch between the UE 115-a and the wireless network. The UE 115-a may discard data messages which may lead to the RLC state mismatch. For example, an RLC receive entity at the UE 115-a may discard any data messages before the UE 115-a receives an acknowledgment status report from the network (e.g., from the base station 105-a. The next RLC message received at the base station 105-a with a sequence number equal to 0 may be the RRC reconfiguration complete message. If the UE 115-a receives a different RLC data message (e.g., an RLC data message which is not an acknowledgment status report for the RRC reconfiguration complete message), the UE 115-a and the network may experience an RLC state mismatch. In some cases, the UE RLC receive entity may discard all receive data with a transmit next acknowledgment field set to a certain value For example, if a state variable (e.g., a TX_Next_ACK field) at the UE RLC entity is equal to 0, the UE 115-a may discard the received data message. The TX_Next_ACK field may be a transmitting RLC entity state variable. If the state variable (e.g., TX_Next_ACK) is equal to 0, the peer receive RLC entity (e.g., at the network) may not have received an RLC message with sequence number 0 (e.g., an RRC reconfiguration complete message).

For example, the UE 115-a may discard the retransmission 210 of the RRC reconfiguration message. When the UE 115-a sends the RRC reconfiguration complete message 220, the base station 105-a may reestablish and create a new RLC entity for the UE 115-a and transmit an acknowledgment 225 to the UE 115-a for the RRC reconfiguration complete message 220. When the UE 115-a receives the acknowledgment 225, the UE 115-a may stop discarding new data messages received at the UE RLC receive entity.

Figure 3:
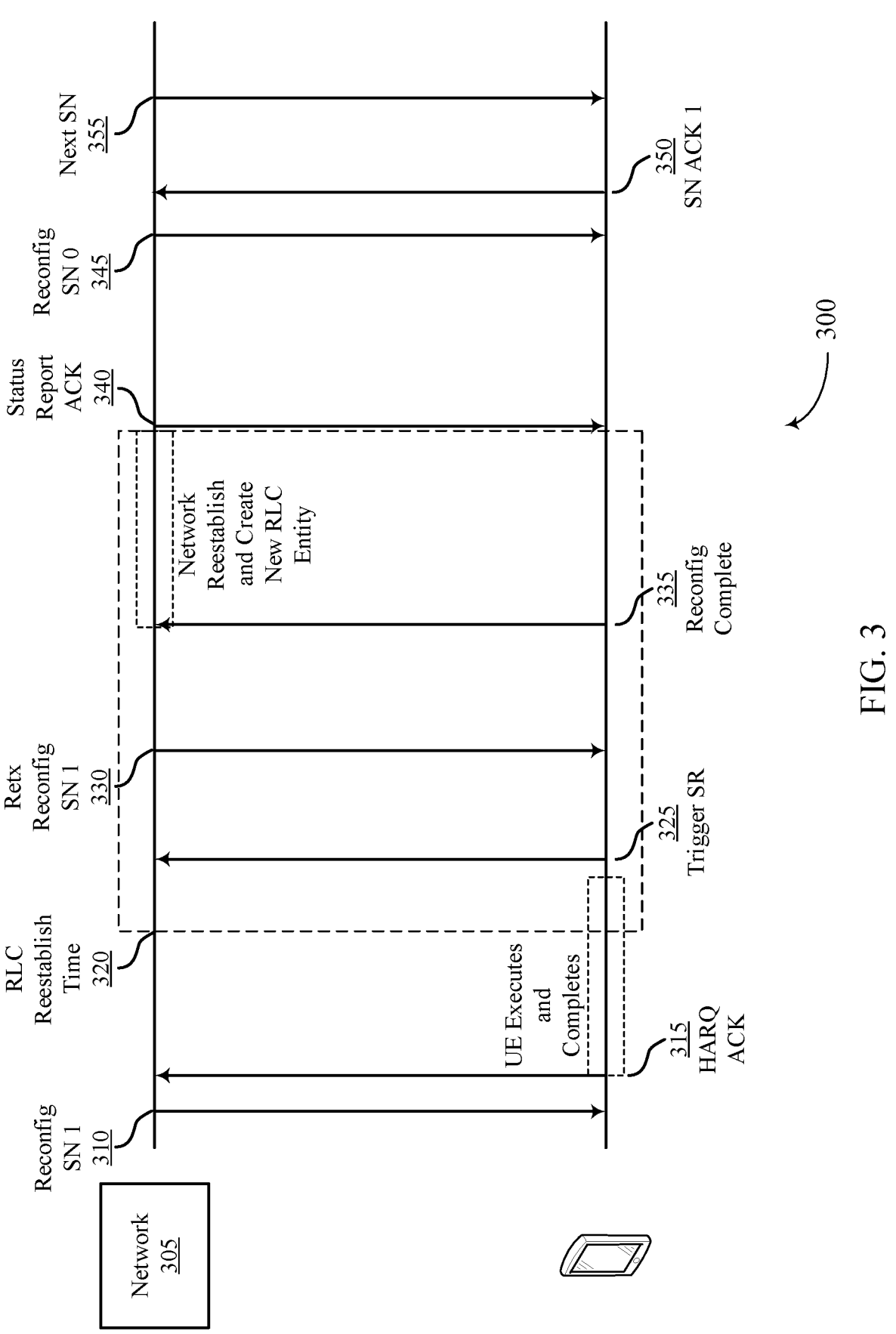
FIG. 3 illustrates an example of a process flow that supports techniques for radio resource control reconfiguration alignment in accordance with aspects of the present disclosure.

FIG. 3 illustrates an example of a process flow 300 that supports techniques for radio resource control reconfiguration alignment in accordance with aspects of the present disclosure. The process flow may be implemented by a UE 115-b or a network entity 305, or both. The UE 115-b may be an example of a UE 115 as described with reference to FIGS. 1 and 2. The network entity 305 may be an example of a base station 105 as described with reference to FIGS. 1 and 2.

At 310, the UE 115-b may receive, from the network entity 305 (e.g., a base station 105), an RRC reconfiguration message. For example, the UE 115-b may receive an RRC reconfiguration message with sequence number 1. The UE 115-b may send a HARQ acknowledgment for the RRC reconfiguration message at 315.

The UE 115-b may reestablish a radio link control entity at the UE 115-b based on receiving the RRC reconfiguration message. For example, the UE 115-b may execute and complete the RRC reconfiguration and begin reestablishing an RLC entity at 315. At 325, the UE 115-b may trigger a scheduling request to send a reconfiguration complete message to the network entity 305. In some cases, the RRC reconfiguration message may trigger the UE 115-b to reestablish an RLC entity for an SRB, such as SRB 1.

In some cases, the UE 115-b may experience a delay. For example, the UE 115-b may experience a delay for processing the RRC reconfiguration message, sending the scheduling request, establishing the RLC entity, or a delay based on poor channel conditions or uplink BLER, or any combination thereof.

In some cases, the network may transmit an RLC data message to the UE 115-*b*. For example, at 330, the network (e.g., via the network entity 305) may retransmit the RRC reconfiguration message to the UE 115-*b*. The delay may trigger the network entity 305 to retransmit the RRC reconfiguration message, such as if the delay causes the network to assume that the UE 115-*b* did not successfully receive or process the RRC reconfiguration message.

The UE 115-*b* may implement techniques to discard all received data at the RLC entity of the UE 115-*b* prior to receiving a status report acknowledgment after reestablishing an RLC entity. For example, the retransmission of the RRC reconfiguration message may be received at the UE 115-*b* after the UE 115-*b* reestablishes the RLC entity. The UE 115-*b* may discard the data message from the RLC entity, as the UE 115-*b* may have not received a status report acknowledgment for the RLC reestablishment procedure. In some cases, this may prevent the RLC entity at the UE 115-*b* from treating the retransmission as a new RLC PDU. In some cases, after reestablishing the RLC entity, the RLC entity at the UE 115-*b* may discard all received data if the data corresponds to a certain sequence number, acknowledgement index, or both. For example, the UE receiving RLC entity may discard all data when a TX_Next_Ack is equal to 0.

At 335, the UE 115-*b* may transmit a reconfiguration complete message to the network entity 305. In some cases, the UE 115-*b* may transmit the reconfiguration complete message before or after receiving an RLC data message which the UE 115-*b* discards. Based on receiving the reconfiguration complete message, the network may reestablish and create a new RLC entity for the UE 115-*b*. At 340, the network entity 340 may transmit a status report acknowledgment to the UE 115-*b*. The status report acknowledgment may indicate or trigger a completion of the reconfiguration for the UE 115-*b*. After receiving the status report acknowledgment at 340, the UE 115-*b* may refrain from discarding RLC messages.

In some cases, at 345, the network entity 305 may transmit a reconfiguration message. The reconfiguration message may have a sequence number of 0. The UE 115-*a* may treat the reconfiguration message as a new RLC data message with a sequence number of 0. at 350, the UE 115-*b* may transmit an acknowledgment with a sequence number of 1. The network entity 305 may receive the RLC message with a sequence number of 1 and continue downlink data transmission. In some cases, at 355, the network entity 305 may send a next data message with a next sequence number.

Figure 4:
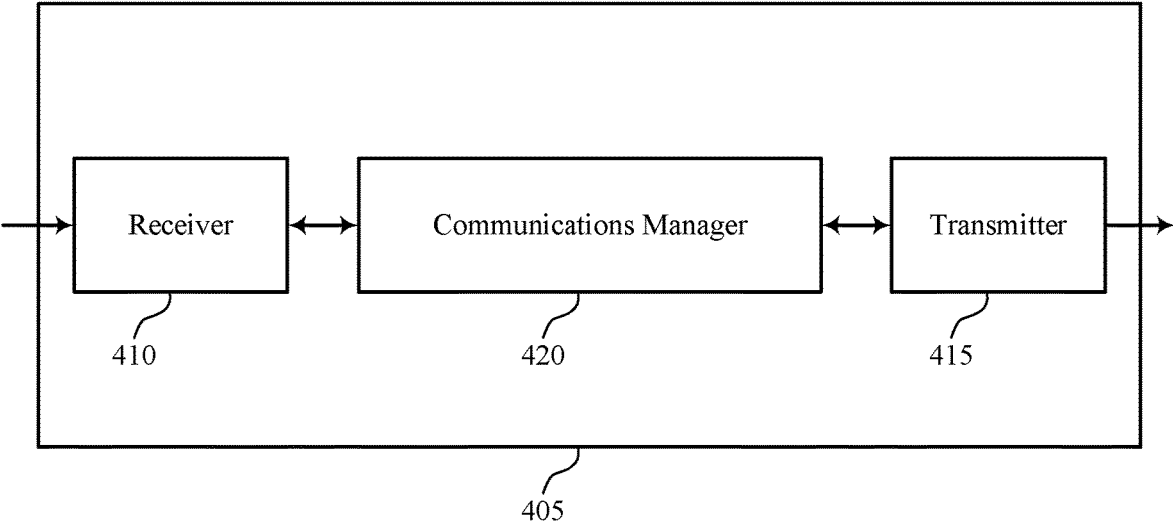
FIGS. 4 and 5 show block diagrams of devices that support techniques for radio resource control reconfiguration alignment in accordance with aspects of the present disclosure.

FIG. 4 shows a block diagram 400 of a device 405 that supports techniques for radio resource control reconfiguration alignment in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for radio resource control reconfiguration alignment). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for radio resource control reconfiguration alignment). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for radio resource control reconfiguration alignment as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, a radio resource control reconfiguration message. The communications manager 420 may be configured as or otherwise support a means for reestablishing a radio link control entity at the UE based on receiving the radio resource control reconfiguration message. The communications manager 420 may be configured as or otherwise support a means for transmitting an indication that the radio link control entity has been reestablished at the UE. The communications manager 420 may be configured as or otherwise support a means for receiving a data message prior to receiving an acknowledgment for the indication that the radio link control entity is reestablished. The communications manager 420 may be configured as or otherwise support a means for discarding the data message based on the data message being received prior to receiving the acknowledgment.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for maintaining RLC entity state synchronization between a UE 115 and a network or network device, such as a base station 105. If the UE 115 and the network have a mismatched RLC state for the UE 115, this may lead to significant delays to reconfigure the RLC entity for the UE 115. By discarding RLC data message after reestablishing an RLC entity but prior to receiving a status report acknowledgment, the UE 115 may prevent the RLC state mismatch. This may reduce power usage at the UE 115, which may be spent attempting to resynchronize the RLC state at the UE 115.

Figure 5:
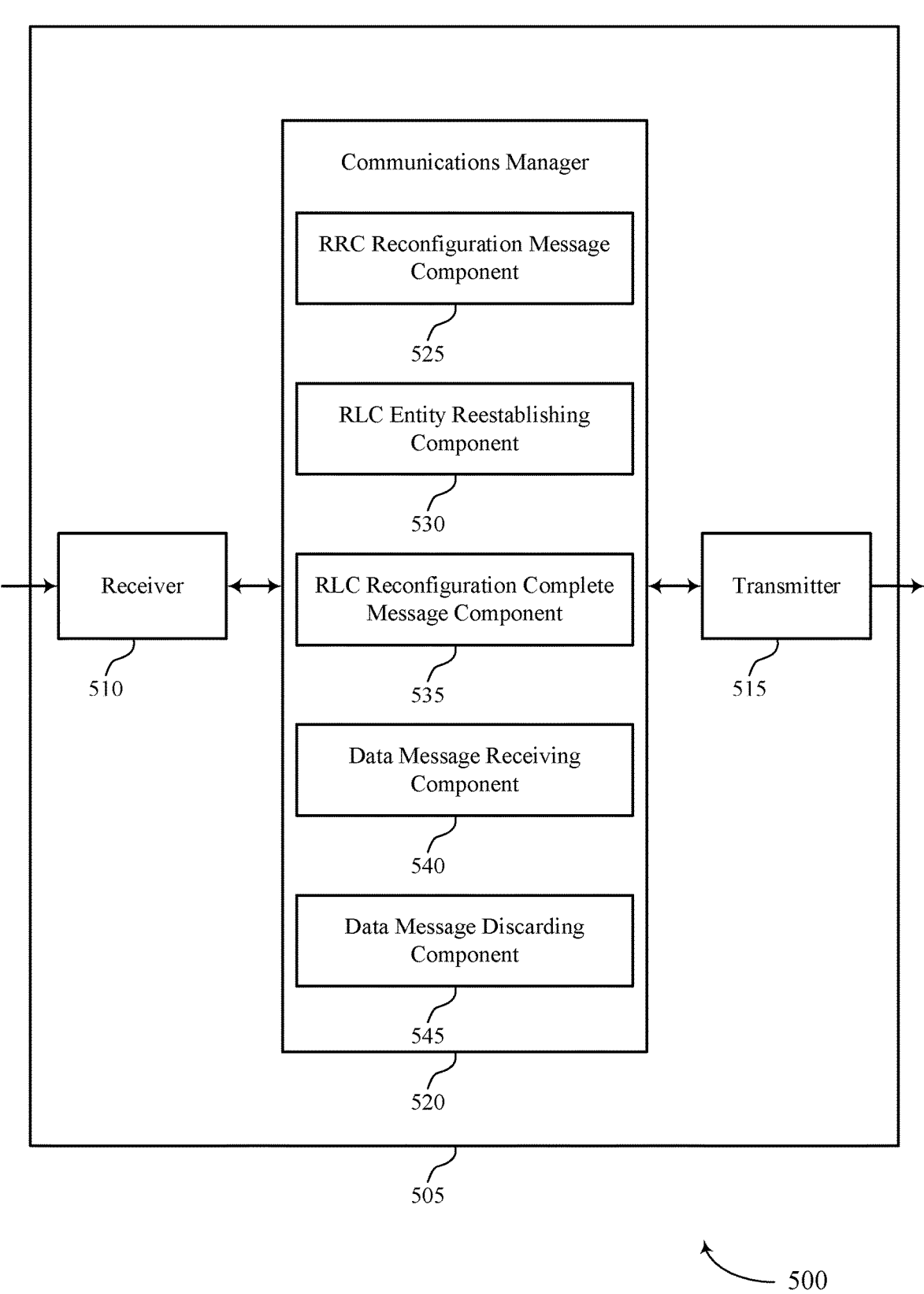

FIG. 5 shows a block diagram 500 of a device 505 that supports techniques for radio resource control reconfiguration alignment in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for radio resource control reconfiguration alignment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for radio resource control reconfiguration alignment). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for radio resource control reconfiguration alignment as described herein. For example, the communications manager 520 may include an RRC reconfiguration message component 525, an RLC entity reestablishing component 530, an RLC reconfiguration complete message component 535, a data message receiving component 540, a data message discarding component 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The RRC reconfiguration message component 525 may be configured as or otherwise support a means for receiving, from a base station, a radio resource control reconfiguration message. The RLC entity reestablishing component 530 may be configured as or otherwise support a means for reestablishing a radio link control entity at the UE based on receiving the radio resource control reconfiguration message. The RLC reconfiguration complete message component 535 may be configured as or otherwise support a means for transmitting an indication that the radio link control entity has been reestablished at the UE. The data message receiving component 540 may be configured as or otherwise support a means for receiving a data message prior to receiving an acknowledgment for the indication that the radio link control entity is reestablished. The data message discarding component 545 may be configured as or otherwise support a means for discarding the data message based on the data message being received prior to receiving the acknowledgment.

Figure 6:
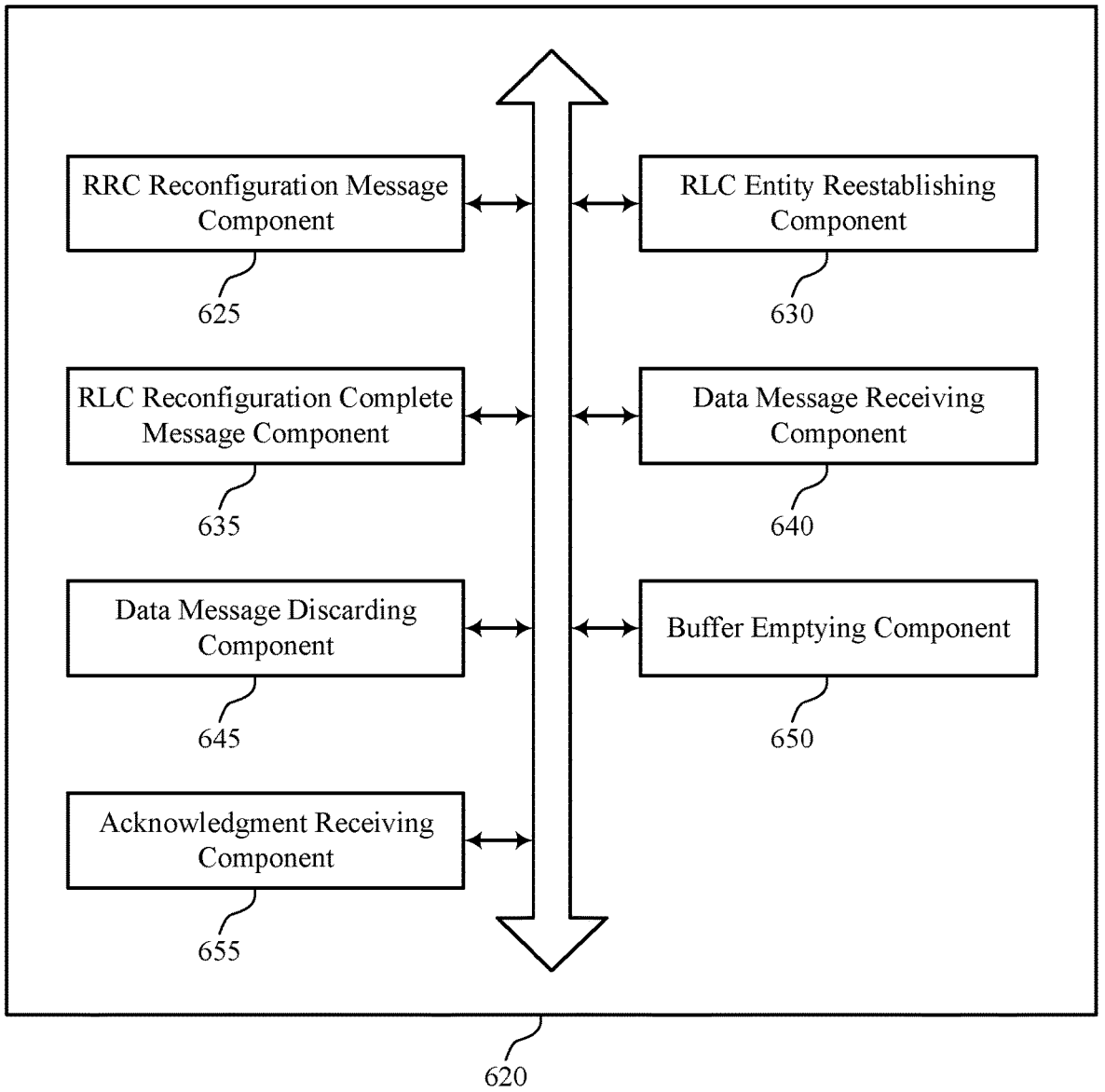
FIG. 6 shows a block diagram of a communications manager that supports techniques for radio resource control reconfiguration alignment in accordance with aspects of the present disclosure.

FIG. 6 shows a block diagram 600 of a communications manager 620 that supports techniques for radio resource control reconfiguration alignment in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for radio resource control reconfiguration alignment as described herein. For example, the communications manager 620 may include an RRC reconfiguration message component 625, an RLC entity reestablishing component 630, an RLC reconfiguration complete message component 635, a data message receiving component 640, a data message discarding component 645, a buffer emptying component 650, an acknowledgment receiving component 655, or any combination thereof. Each of these components may communicate, directly or indirectly, with one another (e.g., via one or more buses).

The communications manager 620 may support wireless communications at a UE in accordance with examples as disclosed herein. The RRC reconfiguration message component 625 may be configured as or otherwise support a means for receiving, from a base station, a radio resource control reconfiguration message. The RLC entity reestablishing component 630 may be configured as or otherwise support a means for reestablishing a radio link control entity at the UE based on receiving the radio resource control reconfiguration message. The RLC reconfiguration complete message component 635 may be configured as or otherwise support a means for transmitting an indication that the radio link control entity has been reestablished at the UE. The data message receiving component 640 may be configured as or otherwise support a means for receiving a data message prior to receiving an acknowledgment for the indication that the radio link control entity is reestablished. The data message discarding component 645 may be configured as or otherwise support a means for discarding the data message based on the data message being received prior to receiving the acknowledgment.

In some examples, to support discarding the data message, the buffer emptying component 650 may be configured as or otherwise support a means for emptying a buffer including at least the data message based on the data message being received prior to receiving the acknowledgment. In some examples, the buffer is a radio link control buffer.

In some examples, the acknowledgment receiving component 655 may be configured as or otherwise support a means for receiving the acknowledgment based on transmitting the indication that the radio link control entity is reestablished.

In some examples, to support discarding the data message, the data message discarding component 645 may be configured as or otherwise support a means for discarding the data message based on a next transmission indicator associated with the data message corresponding to a different radio link control configuration than the reestablished radio link control entity.

In some examples, to support receiving the data message, the data message receiving component 640 may be configured as or otherwise support a means for receiving a retransmission of the radio resource control reconfiguration message based on a delay for reestablishing the radio link control entity, where the data message is discarded based on receiving the retransmission of the radio resource control reconfiguration message.

In some examples, to support receiving the radio resource control reconfiguration message, the RRC reconfiguration message component 625 may be configured as or otherwise support a means for receiving the radio resource control reconfiguration message for a signaling radio bearer corresponding to dedicated RRC signaling. In some examples, the radio resource control reconfiguration message and the data message correspond to a same sequence number. In some examples, the radio resource control reconfiguration message corresponds to a first sequence number and the indication that the radio link control entity is reestablished corresponds to a second sequence number that is different from the first sequence number.

Figure 7:
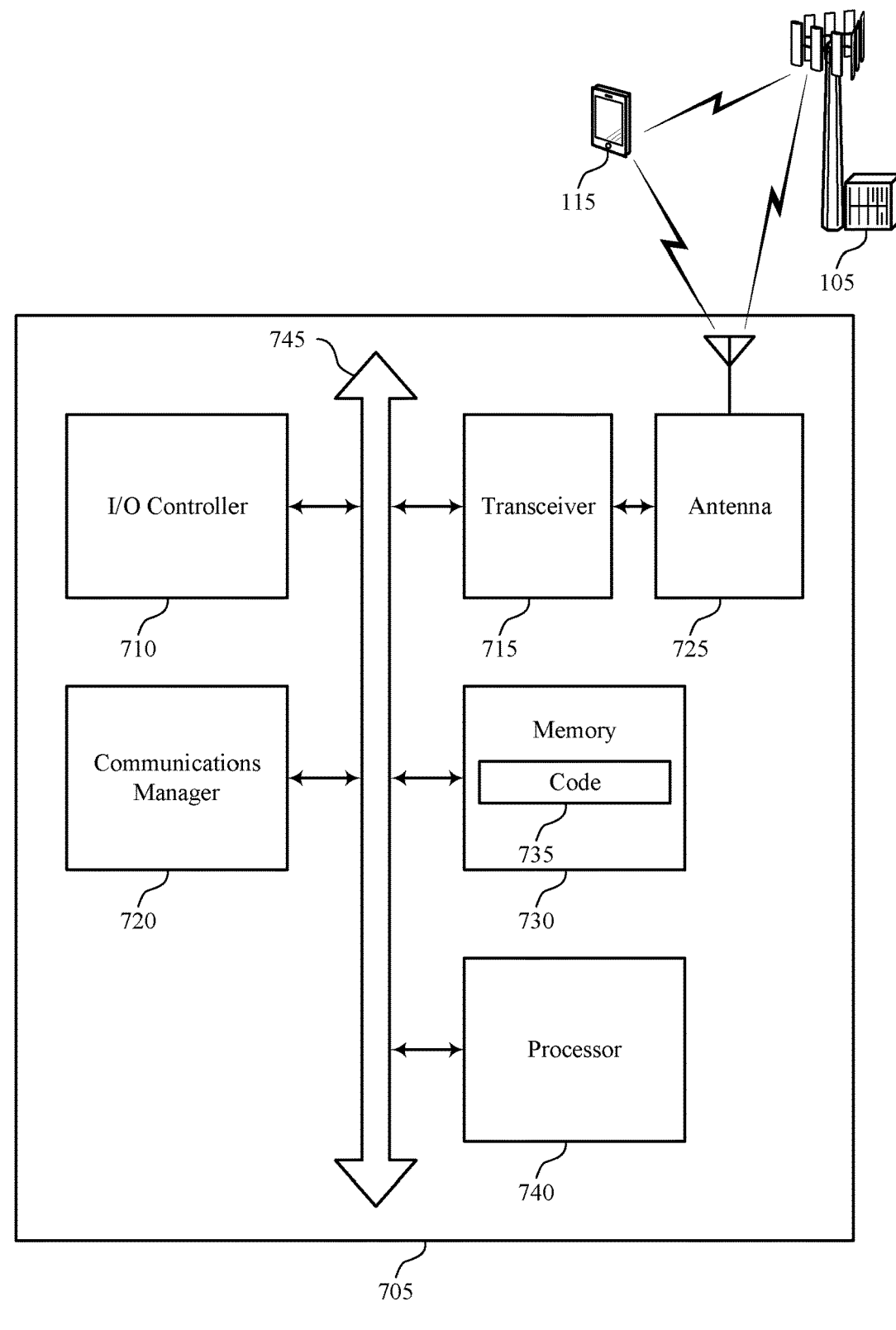
FIG. 7 shows a diagram of a system including a device that supports techniques for radio resource control reconfiguration alignment in accordance with aspects of the present disclosure.

FIG. 7 shows a diagram of a system 700 including a device 705 that supports techniques for radio resource control reconfiguration alignment in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for radio resource control reconfiguration alignment). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, a radio resource control reconfiguration message. The communications manager 720 may be configured as or otherwise support a means for reestablishing a radio link control entity at the UE based on receiving the radio resource control reconfiguration message. The communications manager 720 may be configured as or otherwise support a means for transmitting an indication that the radio link control entity has been reestablished at the UE. The communications manager 720 may be configured as or otherwise support a means for receiving a data message prior to receiving an acknowledgment for the indication that the radio link control entity is reestablished. The communications manager 720 may be configured as or otherwise support a means for discarding the data message based on the data message being received prior to receiving the acknowledgment.

By including or configuring the communications manager 720 in accordance with examples as described herein, the device 705 may support techniques for maintaining RLC entity state synchronization between a UE 115 and a network or network device, such as a base station 105. If the UE 115 and the network have a mismatched RLC state for the UE 115, this may lead to significant delays to reconfigure the RLC entity for the UE 115. By discarding RLC data message after reestablishing an RLC entity but prior to receiving a status report acknowledgment, the UE 115 may prevent the RLC state mismatch.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for radio resource control reconfiguration alignment as described herein, or the processor 740 and the memory 730 may be otherwise configured to perform or support such operations.

FIG. 8 shows a flowchart illustrating a method 800 that supports techniques for radio resource control reconfiguration alignment in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving, from a base station, a radio resource control reconfiguration message. The operations of 805 may be performed in accordance with examples as disclosed herein. In some examples, aspects of the operations of 805 may be performed by an RRC reconfiguration message component 625 as described with reference to FIG. 6.

At 810, the method may include reestablishing a radio link control entity at the UE based on receiving the radio resource control reconfiguration message. The operations of 810 may be performed in accordance with examples as disclosed herein. In some examples, aspects of the operations of 810 may be performed by an RLC entity reestablishing component 630 as described with reference to FIG. 6.

At 815, the method may include transmitting an indication that the radio link control entity has been reestablished at the UE. The operations of 815 may be performed in accordance with examples as disclosed herein. In some examples, aspects of the operations of 815 may be performed by an RLC reconfiguration complete message component 635 as described with reference to FIG. 6.

At 820, the method may include receiving a data message prior to receiving an acknowledgment for the indication that the radio link control entity is reestablished. The operations of 820 may be performed in accordance with examples as disclosed herein. In some examples, aspects of the operations of 820 may be performed by a data message receiving component 640 as described with reference to FIG. 6.

At 825, the method may include discarding the data message based on the data message being received prior to receiving the acknowledgment. The operations of 825 may be performed in accordance with examples as disclosed herein. In some examples, aspects of the operations of 825 may be performed by a data message discarding component 645 as described with reference to FIG. 6.

FIG. 9 shows a flowchart illustrating a method 900 that supports techniques for radio resource control reconfiguration alignment in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving, from a base station, a radio resource control reconfiguration message. The operations of 905 may be performed in accordance with examples as disclosed herein. In some examples, aspects of the operations of 905 may be performed by an RRC reconfiguration message component 625 as described with reference to FIG. 6.

At 910, the method may include reestablishing a radio link control entity at the UE based on receiving the radio resource control reconfiguration message. The operations of 910 may be performed in accordance with examples as disclosed herein. In some examples, aspects of the operations of 910 may be performed by an RLC entity reestablishing component 630 as described with reference to FIG. 6.

At 915, the method may include transmitting an indication that the radio link control entity has been reestablished at the UE. The operations of 915 may be performed in accordance with examples as disclosed herein. In some examples, aspects of the operations of 915 may be performed by an RLC reconfiguration complete message component 635 as described with reference to FIG. 6.

At 920, the method may include receiving a data message prior to receiving an acknowledgment for the indication that the radio link control entity is reestablished. The operations of 920 may be performed in accordance with examples as disclosed herein. In some examples, aspects of the operations of 920 may be performed by a data message receiving component 640 as described with reference to FIG. 6.

At 925, the method may include emptying a buffer including at least the data message based on the data message being received prior to receiving the acknowledgment. The operations of 925 may be performed in accordance with examples as disclosed herein. In some examples, aspects of the operations of 925 may be performed by a buffer emptying component 650 as described with reference to FIG. 6.

FIG. 10 shows a flowchart illustrating a method 1000 that supports techniques for radio resource control reconfiguration alignment in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, a radio resource control reconfiguration message. The operations of 1005 may be performed in accordance with examples as disclosed herein. In some examples, aspects of the operations of 1005 may be performed by an RRC reconfiguration message component 625 as described with reference to FIG. 6.

At 1010, the method may include reestablishing a radio link control entity at the UE based on receiving the radio resource control reconfiguration message. The operations of 1010 may be performed in accordance with examples as disclosed herein. In some examples, aspects of the operations of 1010 may be performed by an RLC entity reestablishing component 630 as described with reference to FIG. 6.

At 1015, the method may include transmitting an indication that the radio link control entity has been reestablished at the UE. The operations of 1015 may be performed in accordance with examples as disclosed herein. In some examples, aspects of the operations of 1015 may be performed by an RLC reconfiguration complete message component 635 as described with reference to FIG. 6.

At 1020, the method may include receiving a data message prior to receiving an acknowledgment for the indication that the radio link control entity is reestablished. The operations of 1020 may be performed in accordance with examples as disclosed herein. In some examples, aspects of the operations of 1020 may be performed by a data message receiving component 640 as described with reference to FIG. 6.

At 1025, the method may include discarding the data message based on the data message being received prior to receiving the acknowledgment. The operations of 1025 may be performed in accordance with examples as disclosed herein. In some examples, aspects of the operations of 1025 may be performed by a data message discarding component 645 as described with reference to FIG. 6.

At 1030, the method may include receiving the acknowledgment based on transmitting the indication that the radio link control entity is reestablished. The operations of 1030 may be performed in accordance with examples as disclosed herein. In some examples, aspects of the operations of 1030 may be performed by an acknowledgment receiving component 655 as described with reference to FIG. 6.

The following provides an overview of aspects of the present disclosure:

Aspect 1: A method for wireless communications at a UE, comprising: receiving, from a base station, a radio resource control reconfiguration message; reestablishing a radio link control entity at the UE based at least in part on receiving the radio resource control reconfiguration message; transmitting an indication that the radio link control entity has been reestablished at the UE; receiving a data message prior to receiving an acknowledgment for the indication that the radio link control entity is reestablished; and discarding the data message based at least in part on the data message being received prior to receiving the acknowledgment.

Aspect 2: The method of aspect 1, wherein discarding the data message comprises: emptying a buffer including at least the data message based at least in part on the data message being received prior to receiving the acknowledgment.

Aspect 3: The method of aspect 2, wherein the buffer is a radio link control buffer.

Aspect 4: The method of any of aspects 1 through 3, further comprising: receiving the acknowledgment based at least in part on transmitting the indication that the radio link control entity is reestablished.

Aspect 5: The method of any of aspects 1 through 4, wherein discarding the data message comprises: discarding the data message based at least in part on a next transmission indicator associated with the data message corresponding to a different radio link control configuration than the reestablished radio link control entity.

Aspect 6: The method of any of aspects 1 through 5, wherein receiving the data message comprises: receiving a retransmission of the radio resource control reconfiguration message based at least in part on a delay for reestablishing the radio link control entity, wherein the data message is discarded based at least in part on receiving the retransmission of the radio resource control reconfiguration message.

Aspect 7: The method of any of aspects 1 through 6, wherein receiving the radio resource control reconfiguration message comprises: receiving the radio resource control reconfiguration message for a signaling radio bearer corresponding to dedicated Radio Resource Control (RRC) signaling.

Aspect 8: The method of any of aspects 1 through 7, wherein the radio resource control reconfiguration message and the data message correspond to a same sequence number.

Aspect 9: The method of any of aspects 1 through 8, wherein the radio resource control reconfiguration message corresponds to a first sequence number and the indication that the radio link control entity is reestablished corresponds to a second sequence number that is different from the first sequence number.

Aspect 10: An apparatus for wireless communications at a UE, comprising a processor; memory coupled with the processor; and instructions stored in the memory and executable by the processor to cause the apparatus to perform a method of any of aspects 1 through 9.

Aspect 11: An apparatus for wireless communications at a UE, comprising at least one means for performing a method of any of aspects 1 through 9.

Aspect 12: A non-transitory computer-readable medium storing code for wireless communications at a UE, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a radio resource control reconfiguration message;
   reestablishing a radio link control entity at the UE based at least in part on receiving the radio resource control reconfiguration message;
   transmitting an indication that the radio link control entity has been reestablished at the UE;
   receiving a data message prior to receiving an acknowledgment for the indication that the radio link control entity is reestablished; and
   discarding the data message based at least in part on the data message being received prior to receiving the acknowledgment.

2. The method of claim 1, wherein discarding the data message comprises:
   emptying a buffer including at least the data message based at least in part on the data message being received prior to receiving the acknowledgment.

3. The method of claim 2, wherein the buffer is a radio link control buffer.

4. The method of claim 1, further comprising:
   receiving the acknowledgment based at least in part on transmitting the indication that the radio link control entity is reestablished.

5. The method of claim 1, wherein discarding the data message comprises:
   discarding the data message based at least in part on a next transmission indicator associated with the data message corresponding to a different radio link control configuration than the reestablished radio link control entity.

6. The method of claim 1, wherein receiving the data message comprises:
   receiving a retransmission of the radio resource control reconfiguration message based at least in part on a delay for reestablishing the radio link control entity, wherein the data message is discarded based at least in part on receiving the retransmission of the radio resource control reconfiguration message.

7. The method of claim 1, wherein receiving the radio resource control reconfiguration message comprises:
   receiving the radio resource control reconfiguration message for a signaling radio bearer corresponding to dedicated Radio Resource Control (RRC) signaling.

8. The method of claim 1, wherein the radio resource control reconfiguration message and the data message correspond to a same sequence number.

9. The method of claim 1, wherein the radio resource control reconfiguration message corresponds to a first sequence number and the indication that the radio link control entity is reestablished corresponds to a second sequence number that is different from the first sequence number.

10. An apparatus for wireless communications at a user equipment (UE), comprising:
   one or more processors;
   one or more memories coupled with the one or more processors; and
   instructions stored in the one or more memories and executable by the one or more processors to cause the apparatus to:

receive, from a base station, a radio resource control reconfiguration message;
   reestablish a radio link control entity at the UE based at least in part on receiving the radio resource control reconfiguration message;
   transmit an indication that the radio link control entity has been reestablished at the UE;
   receive a data message prior to receiving an acknowledgment for the indication that the radio link control entity is reestablished; and
   discard the data message based at least in part on the data message being received prior to receiving the acknowledgment.

11. The apparatus of claim 10, wherein the instructions to discard the data message are executable by the one or more processors to cause the apparatus to:
   empty a buffer including at least the data message based at least in part on the data message being received prior to receiving the acknowledgment.

12. The apparatus of claim 11, wherein the buffer is a radio link control buffer.

13. The apparatus of claim 10, wherein the instructions are further executable by the one or more processors to cause the apparatus to:
   receive the acknowledgment based at least in part on transmitting the indication that the radio link control entity is reestablished.

14. The apparatus of claim 10, wherein the instructions to discard the data message are executable by the one or more processors to cause the apparatus to:
   discard the data message based at least in part on a next transmission indicator associated with the data message corresponding to a different radio link control configuration than the reestablished radio link control entity.

15. The apparatus of claim 10, wherein the instructions to receive the data message are executable by the one or more processors to cause the apparatus to:
   receive a retransmission of the radio resource control reconfiguration message based at least in part on a delay for reestablishing the radio link control entity, wherein the data message is discarded based at least in part on receiving the retransmission of the radio resource control reconfiguration message.

16. The apparatus of claim 10, wherein the instructions to receive the radio resource control reconfiguration message are executable by the one or more processors to cause the apparatus to:
   receive the radio resource control reconfiguration message for a signaling radio bearer corresponding to dedicated Radio Resource Control (RRC) signaling.

17. The apparatus of claim 10, wherein:
   the radio resource control reconfiguration message and the data message correspond to a same sequence number.

18. The apparatus of claim 10, wherein the radio resource control reconfiguration message corresponds to a first sequence number and the indication that the radio link control entity is reestablished corresponds to a second sequence number that is different from the first sequence number.

19. An apparatus for wireless communications at a user equipment (UE), comprising:
   means for receiving, from a base station, a radio resource control reconfiguration message;
   means for reestablishing a radio link control entity at the UE based at least in part on receiving the radio resource control reconfiguration message;

means for transmitting an indication that the radio link control entity has been reestablished at the UE;

means for receiving a data message prior to receiving an acknowledgment for the indication that the radio link control entity is reestablished; and means for discarding the data message based at least in part on the data message being received prior to receiving the acknowledgment.

20. The apparatus of claim 19, wherein the means for discarding the data message comprise:

means for emptying a buffer including at least the data message based at least in part on the data message being received prior to receiving the acknowledgment.

21. The apparatus of claim 20, wherein the buffer is a radio link control buffer.

22. The apparatus of claim 19, further comprising:

means for receiving the acknowledgment based at least in part on transmitting the indication that the radio link control entity is reestablished.

23. The apparatus of claim 19, wherein the means for discarding the data message comprise:

means for discarding the data message based at least in part on a next transmission indicator associated with the data message corresponding to a different radio link control configuration than the reestablished radio link control entity.

24. The apparatus of claim 19, wherein the means for receiving the data message comprise:

means for receiving a retransmission of the radio resource control reconfiguration message based at least in part on a delay for reestablishing the radio link control entity, wherein the data message is discarded based at least in part on receiving the retransmission of the radio resource control reconfiguration message.

25. The apparatus of claim 19, wherein the means for receiving the radio resource control reconfiguration message comprise:

means for receiving the radio resource control reconfiguration message for a signaling radio bearer corresponding to dedicated Radio Resource Control (RRC) signaling.

26. The apparatus of claim 19, wherein:

the radio resource control reconfiguration message and the data message correspond to a same sequence number.

27. The apparatus of claim 19, wherein the radio resource control reconfiguration message corresponds to a first sequence number and the indication that the radio link control entity is reestablished corresponds to a second sequence number that is different from the first sequence number.

28. A non-transitory computer-readable medium storing code for wireless communications at a user equipment (UE), the code comprising instructions executable by a processor to:

receive, from a base station, a radio resource control reconfiguration message;

reestablish a radio link control entity at the UE based at least in part on receiving the radio resource control reconfiguration message;

transmit an indication that the radio link control entity has been reestablished at the UE;

receive a data message prior to receiving an acknowledgment for the indication that the radio link control entity is reestablished; and discard the data message based at least in part on the data message being received prior to receiving the acknowledgment.

29. The non-transitory computer-readable medium of claim 28, wherein the instructions to discard the data message are executable by the processor to:

empty a buffer including at least the data message based at least in part on the data message being received prior to receiving the acknowledgment.

30. The non-transitory computer-readable medium of claim 29, wherein the buffer is a radio link control buffer.

\* \* \* \* \*